United States Patent [19]
Dasso

[11] Patent Number: 5,701,154
[45] Date of Patent: Dec. 23, 1997

[54] ELECTRONIC THREE-DIMENSIONAL VIEWING SYSTEM

[76] Inventor: John M. Dasso, 2933 S.E. Taylor, Portland, Oreg. 97214

[21] Appl. No.: 333,130
[22] Filed: Nov. 1, 1994
[51] Int. Cl.⁶ .............................. H04N 13/00; H04N 15/00
[52] U.S. Cl. .............................................. 348/42; 348/51
[58] Field of Search ................................. 348/42, 51, 53, 348/52, 44; H04N 13/00, 15/00

[56] References Cited

U.S. PATENT DOCUMENTS

| | | | |
|---|---|---|---|
| 2,865,988 | 12/1958 | Cafarelli | 348/42 |
| 3,527,880 | 9/1970 | Gordon | 348/44 |
| 3,852,579 | 12/1974 | Sohn | 235/151.3 |
| 4,462,044 | 7/1984 | Thomason et al. | 348/44 |
| 4,510,525 | 4/1985 | Kuperman et al. | 348/42 |
| 4,705,371 | 11/1987 | Beard | 348/42 |
| 4,709,263 | 11/1987 | Brumage | 348/42 |
| 4,743,964 | 5/1988 | Allard et al. | 348/42 |
| 4,791,478 | 12/1988 | Tredwell et al. | 348/42 |
| 4,893,898 | 1/1990 | Beard | 348/42 |
| 4,907,860 | 3/1990 | Noble | 348/42 |
| 4,952,024 | 8/1990 | Gale | 348/53 |
| 4,979,033 | 12/1990 | Stephens | 348/51 |
| 5,091,719 | 2/1992 | Beamon, III | 348/51 |
| 5,151,821 | 9/1992 | Marks | 348/44 |
| 5,243,460 | 9/1993 | Kornberg | 348/42 |
| 5,260,773 | 11/1993 | Dischert | 348/42 |

FOREIGN PATENT DOCUMENTS

| | | | |
|---|---|---|---|
| WO9015356 | 12/1990 | WIPO | H04N 13/00 |

*Primary Examiner*—Tommy P. Chin
*Assistant Examiner*—Vu Le
*Attorney, Agent, or Firm*—Robert L. Harrington

[57] ABSTRACT

An electronic three-dimensional viewing system. A monitor is positioned in front of each eye and an identical motion picture is displayed on each monitor. The displays are synchronized so that one of the displays slightly precedes the other. Controls are provided to control the degree of advance and also the darkness of the projection in one monitor relative to the other. Further controls provide slight image distortion, e.g., horizontal shifting, enlargement and reduction. The controls enable a viewer to adjust the three-dimensional affect created by the different configurations created for the images as seen by the two eyes of the viewer.

12 Claims, 2 Drawing Sheets

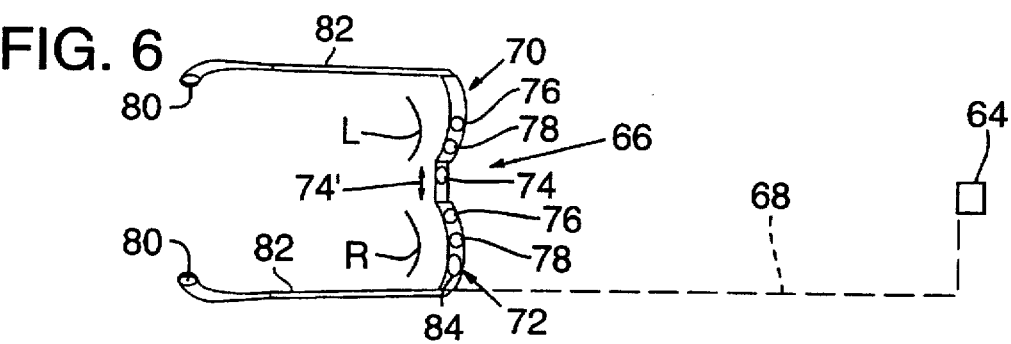
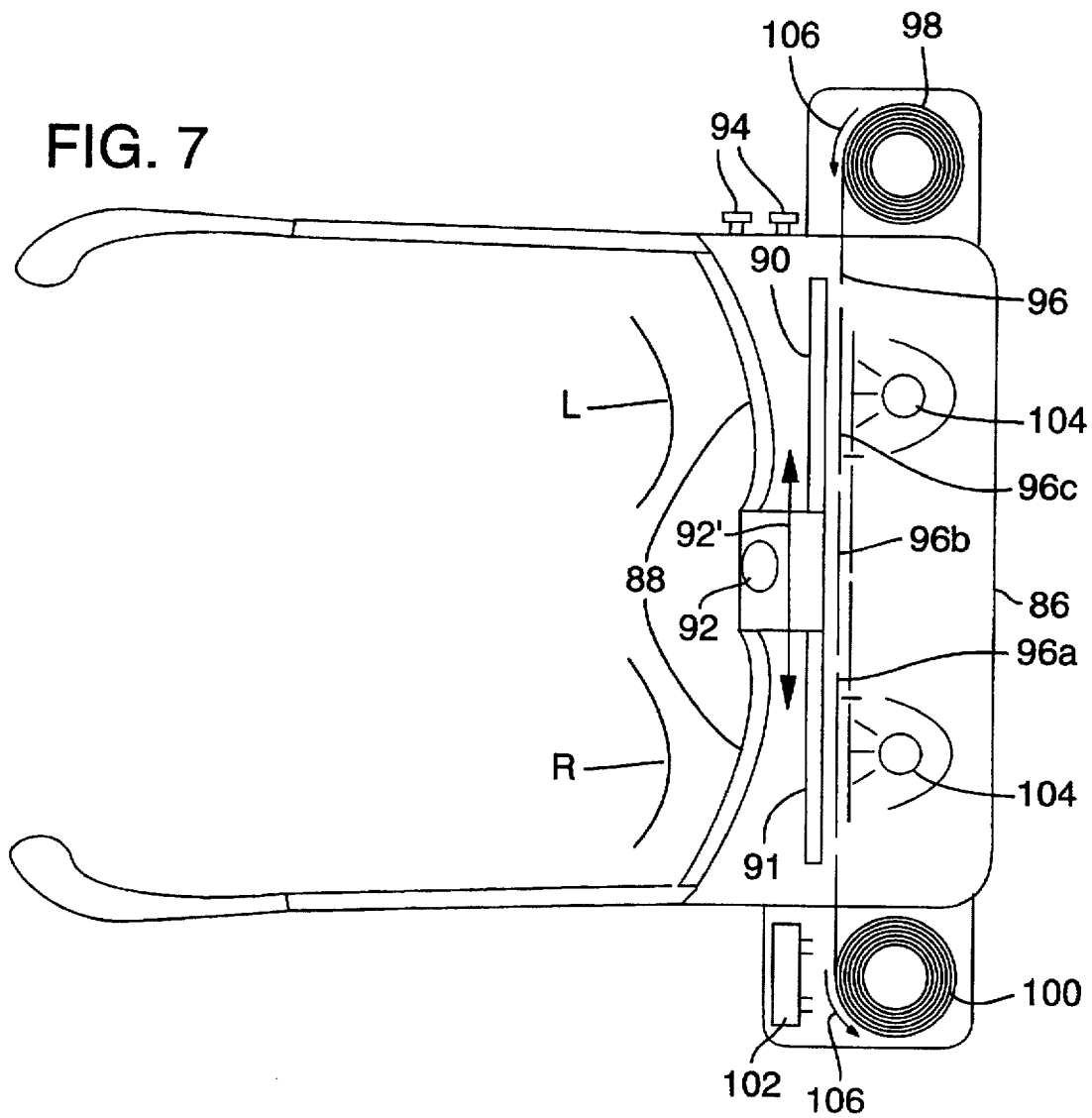

ELECTRONIC THREE-DIMENSIONAL VIEWING SYSTEM

FIELD OF THE INVENTION

This invention relates to the viewing of duplicate images projected on two different viewing screens, which projected images are independently electronically controlled and a viewer seeing one screen with one eye and the other screen with the other eye perceives the images in three dimension.

BACKGROUND OF THE INVENTION

The inventor hereof is the same inventor of the inventions in pending applications for patents U.S. Ser. No. 990,394 filed Dec. 10, 1992 now U.S. Pat. No. 5,434,613 and U.S. Ser. No. 152,200 filed Nov. 12, 1993 now abandoned and the disclosures of said applications are incorporated herein in their entirety by reference.

The prior inventions generate three-dimension moving images on a planar screen by the provision of specially constructed eyeglasses. The concept involves causing the two eyes to see the same moving images in slightly different configurations. The lenses of the eyeglasses are constructed differently (including density and tinting in particular) to cause one eye to see the image later in time (by a small fraction of a second) so that the one eye sees the image slightly offset from that of the other eye. The slight difference is interpreted by the brain as dimension.

A problem with this concept of the prior inventions is that different individuals can have different reactions to the same eyeglasses configuration. Ideally the 3-D eyeglasses would be custom made to suit each individual but that is impractical. Further, there are practical limits as to the types and degrees of differences that can be provided in the lenses of a pair of eyeglasses.

BRIEF SUMMARY OF THE INVENTION

The present invention improves on the above-described concept of providing 3-D viewing of two-dimensional display through eyeglasses. It is understood that a two-dimensional display as used in the present invention is the accumulation of sequential recordings of images in motion appearing in a stationary scene recorded from a single line of sight by a single camera which are sometimes referred to herein as motion pictures. As an example, consider the playing of two identical video tapes in two different VCR's and projecting the images produced by the VCR's onto two different TV screens. The screens are constructed and arranged so as to enable a viewer to see one screen with one eye and the other screen with the other eye, e.g., using miniaturized screens mounted in a pair of goggles or a helmet. (The screens should be spaced apart to match the spacing of the viewer's eyes and it is desirable to provide adjustment of the spacing of the screens in glasses that will be worn by different viewers.)

Consider the various adjustment controls available for TV viewing (particularly on the older sets) where brightness can be varied, and the image can be horizontally widened or narrowed and shifted from side to side. The side shifting is an important advantage as it will allow a viewer to shift picture edges into view, e.g., for one eye versus the other and further emphasize differences as between the images viewed by the two eyes.

From prior experience, it is known that differences as seen by the two eyes of the same image are interpreted by the viewer's brain as three dimension. In the example referred to above, one of the films in the two VCR's is advanced by one or several frames. Thus, the same image is projected slightly later in time and the moving images on the tapes are viewed at slightly different positions. For most television viewing, this delay coupled with the ability to side shift the picture frames relative to the screen, e.g., with the horizontal hold, produces significant three-dimensional viewing without other adjustments.

That same image may be made darker through the adjustment in the brightness control setting of the TV monitor. That same image may also be widened slightly (or narrowed) also by the horizontal adjustment control. Whereas the present disclosure discloses a single control, it may be desirable to provide two horizontal controls. The overall intent is to electronically create a visual difference of the same image and that that difference be perceived as depth. Whereas two films are being viewed, the sound track is taken off either (but not both) films. The images are so close together that lip synchronization is not likely to be considered a factor.

Whereas the above example is a cumbersome way to produce the desired 3-D effect by electronics, it demonstrates the operability of the concept. A more practical system will be one that is custom made to produce the same desired effects with a more simple set up of electronic equipment. The dual VCRs can be replaced by a time delay circuit provided for the screen of the one eye and the controls for horizontal and/or brightness adjustment can be provided independent of the TV monitor. A further modification may be to provide for horizontal feeding of the film. The film frames would be spaced according to the eye spacings and both eyes would view the same film but see different frames of the film. These and numerous variations will become apparent to those skilled in the art from the above summary and the more detailed disclosure which follows.

DESCRIPTION OF THE DRAWINGS

FIG. 6 is an embodiment which is considered to be a possible future embodiment of the invention.

FIG. 7 is an embodiment wherein a film is fed laterally through a viewer incorporating the invention.

DESCRIPTION OF THE PREFERRED EMBODIMENT

In all of the figures the left and right eyes of a viewer are indicated by the reference letters L and R, respectively.

Figure 1:
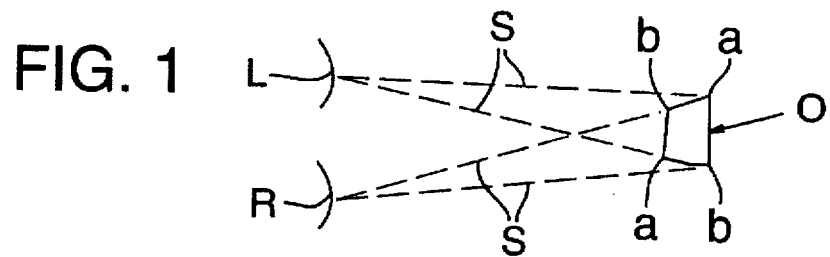
FIG. 1 illustrates conventional viewing of an object in three-dimension.

Referring first to FIG. 1, illustrated are the two eyes L and R of a viewer viewing a three-dimensional object O. The site lines S are shown in dash lines and as will be noted, the left eye L sees the object between points a—a and the right eye sees the object between points b—b. The differences as between a—a and b—b are in part what allows viewers to see the object in three-dimension.

Figure 2:
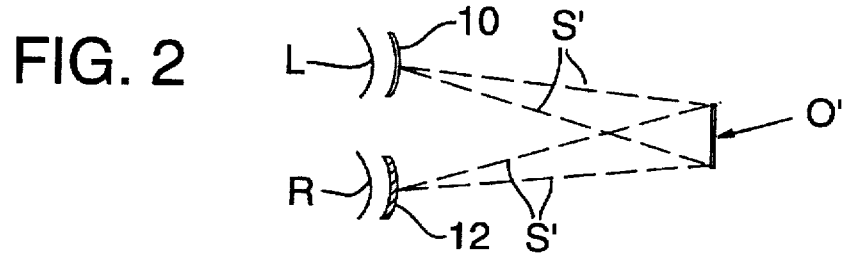
FIG. 2 illustrates a prior invention of the same inventor to which the present invention is an improvement.

FIG. 2 illustrates the two eyes L and R of a viewer viewing a two-dimensional object O'. Object O' represents a three-dimensional object compressed into two-dimensional display and projected onto a screen, e.g., a television or motion picture screen. As will be noted by the view lines S', both eyes see the same area of the object O'. In accordance with a prior invention referred to above, lenses 10 and 12 are placed in front of eyes L and R, respectively. Lens 12 is more optically dense than lens 10. It is also tinted and the combination has the effect whereby the viewer's brain "sees" the image through the right eye R at a slightly later time (a small fraction of a second). It is intended that object O' is a moving image, e.g., in a motion picture projected on a screen. Thus, as image O' "moves" on the screen, it is seen in a slightly different configuration by the two eyes and that difference is interpreted by the viewer's brain as depth.

Figure 3:
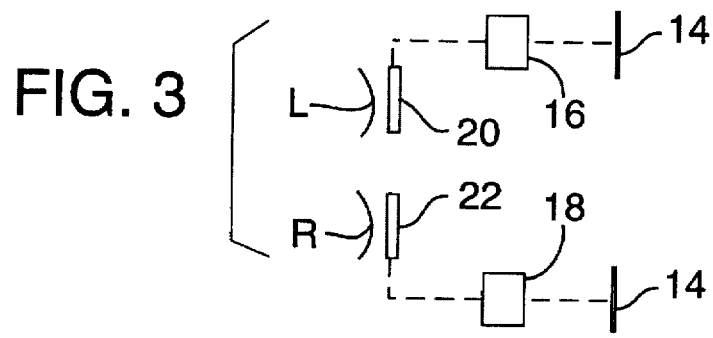
FIG. 3 illustrates the basic concept of the present invention.

FIG. 3 illustrates schematically the improvement of the present invention. In FIG. 3, duplicate copies of object 14 (a motion picture film) are transmitted through control boxes 16 and 18 to left eye and right eye monitors 20 and 22. The control boxes 16 and 18 perform a number of functions. The transmission of the image 14, e.g., to the right eye monitor 22 may be delayed a small fraction of a second. The image 14 may be darkened, colors changed and/or the projection of the image distorted. Thus, the same image is viewed by the left and right eyes but in a different configuration, e.g., because the image is moving it will be in a slightly different position; and/or it will be wider versus narrower or shorter versus taller; and/or one may be slightly darker and of a slightly different color. Side shifting of the frame relative to the viewing window is also accomplished by the control boxes 16, 18. As those skilled in the art will appreciate, no one difference can be a dramatic difference and optimum viewing may be different combinations for different viewers. As explained above, side shifting and frame delay will often provide the total desired effect. A specific example of how the differences are achieved in a working embodiment is illustrated in FIG. 4.

Figure 4:
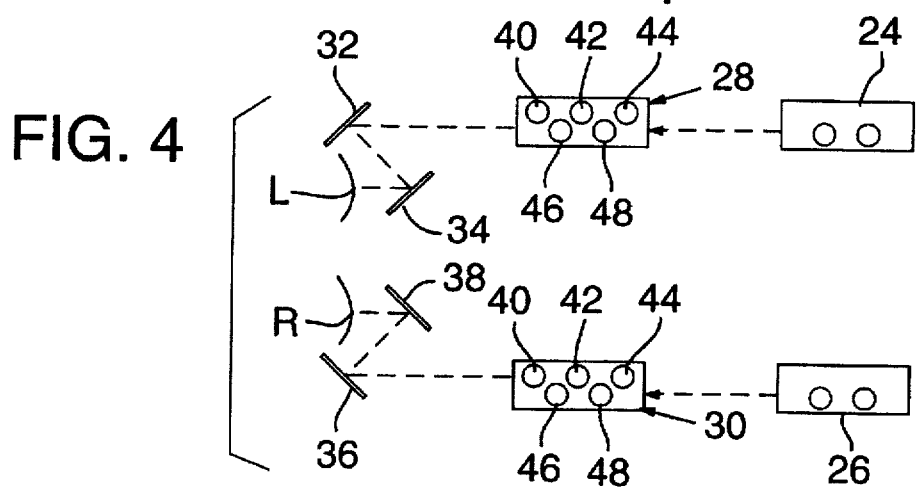
FIG. 4 illustrates an embodiment of the present invention which has been built and tested and represents the best embodiment as applicant presently knows to practice the invention.

FIG. 4 represents an actual construction built and tested to verify the workability of the invention. Items 24, 26 represent video cassette recorders (VCRs) and items 28, 30 represent 1960's vintage type televisions sets (Tvs). The 1960's TVs were used because they were provided with manual controls for tint, color, contrast, horizontal hold, and vertical height or line adjustment. The modern TVs have automatic adjustments of these features. The picture produced by each of the TVs 28, 30 were projected through mirrors 32, 34 for the left eye L and mirrors 36, 38 for the right eye R. The image projected on mirror 34 was thus seen by the left eye L and the image projected on the mirror 38 was seen by the right eye R. The mirrors 34, 38 were spaced to accommodate a specific subject (viewer).

Identical tape recordings were played in the two VCRs. However, prior to starting the tapes, one of the tapes, e.g., for VCR 26 (depending on which eye L or R was the dominant eye) was advanced between one and five frames. Thus, upon simultaneous start of the two VCRs, VCR 26 continuously played the tape between one and five frames earlier than VCR 24. (In practice it was learned that no two VCRs run at exactly the same speed and in the embodiment here described the tapes had to be readjusted one or more times during playing of, e.g., a two-hour film).

The TV 30 was also adjusted relative to TV 28. Control button 40 represents tint control, 42 color, 44 contrast, 46 horizontal hold and 48 brightness. (Vertical height or line adjustment is considered of lesser importance and is eliminated from the prototype illustration of FIG. 4.)

VCR 24 presents the image later in time. It is desirable to provide the same image that is viewed later in time with a darker image and this is accomplished by adjustment of one or more of the controls for tint, color and contrast (controls 40, 42, 44 and 48). The picture of VCR 24 was side shifted relative to VCR 26, i.e., the frame of the film was adjusted on the TV's viewing screen by horizontal hold 46 to provide edge differential as between the pictures viewed by the viewer through the two screens of TVs 28 and 30.

It will be appreciated that the differential in time frame positioning and in controls 40-48 are adjusted according to individual preference. One viewer may prefer more enhanced differences and, thus, a more prominent three-dimensional effect than another viewer. The controls as indicated were provided primarily because of availability. One or more of the controls 40-48 for both TVs may be eliminated or even all the controls 40-48 may be eliminated from one of the TVs. Thus, the TV 28 might have no controls and the difference produced solely by the controls of TV 30 (or vice versa). In any event, once the desired image is created for each of the TVs 28, 30, that image is projected through the mirror arrangement 32, 34 and 36, 38 to the viewer's eyes.

Figure 5:
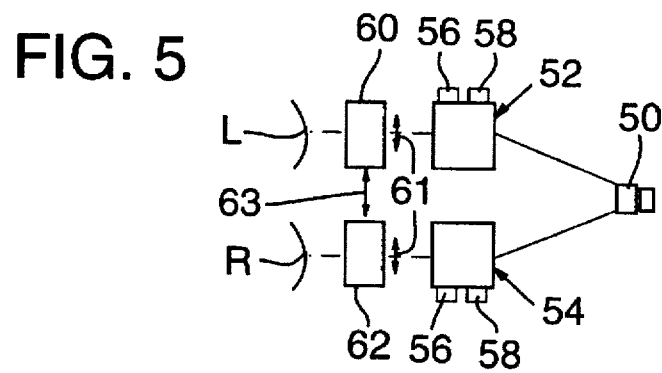
FIG. 5 is an embodiment which is believed to incorporate known technology.

Reference is now made to FIG. 5 which illustrates the more likely commercial application of the invention. Item 50 is an antenna, cable or satellite input jack. The signal is split and transmitted by cable to a left eye control unit 52 and a right eye control unit 54. Illustrated are two controls for each of the control units, control 56 controlling, e.g., frame delay, and control 58 controlling horizontal hold. (Side shifting of the film frame relative to the screen is indicated by arrows 61 and spacing of the monitors or screens is indicated by arrow 63.) Receiver/monitors 60, 62 positioned in front of the left and right eyes, respectively, may be contained in a helmet (as are control units 52, 54). Not only is the viewer able to receive optimum three-dimension of a two-dimension screen but also all distractions can thereby be eliminated.

It is to be appreciated that the three-dimensional effect achieved by all of the systems herein described are workable with conventional film projectors. Thus, images that otherwise are projected by the source in two-dimension are rendered three-dimensional by reason of the same images being viewed in different configurations which is interpreted by the brain as depth.

FIG. 6 represents a more futuristic version in which the present invention may be embodied. Item 64 represents a receiver/transmitter, e.g., as may be installed anywhere in a residence and which receives wireless transmission, e.g., from a satellite and conveys that transmission (also wireless) to a viewer. Goggles 66 include receivers that receive the signal 68 from the transmitter 64. The eye pieces 70, 72 of the goggles 66 are miniature monitors that convert the signal 68 to TV pictures positioned in front of the viewer's eyes L and R. The spacing of the screens is achieved by control 74 as indicated by arrow 74'. Control 84 provides a delay in the transmission to either the left or right eye and tint/brightness/color are controlled by control 76 and horizontal/vertical distortion is controlled by control 78. Sound can be provided by miniature speakers 80 provided in the temple pieces 82 of the goggles. As conceived, the goggles themselves will provide channel selection and different viewers can not only adjust for the desired three-dimensional effect, but also view different programs.

In the conceptual design of FIG. 6, the viewer has no restrictions in movement. The goggles can be provided with split viewing as in bifocals currently provided for reading, i.e., whereby the viewer is able to read through one section (a bottom portion of the lens) and see distance through the other portion. Trips to the refrigerator, etc. can be taken without interrupting the picture. Different individuals can watch different programs. Sound is adjusted to individual preferences, etc.

FIG. 7 illustrates a further modification. A fully contained viewing system including a viewer housing 86 defining viewing windows 88. Viewing screens 90, 91 are positioned inside the viewer and the spacing therebetween is controlled by control 92 (the adjustment indicated by arrow 92'). Controls 94 adjust for brightness, etc. A film 96 contained in spool 98 is unwound therefrom and onto spool 100, e.g., by a battery powered motor 102. As illustrated, a frame 96a of the film 96 is positioned behind screen 91, frame 96b is intermediate screens 90, 91 and frame 96c is positioned behind screen 90. Light sources 104 project the images of frames 96a and 96c onto screens 91–90, respectively. The film frames are intermittently moved past screens 90, 91 in the direction indicated by arrows 106 and sequentially viewed with eye R always seeing the image subsequent to eye L, i.e., two frames later than that of eye L.

These and many other variations are contemplated for the present invention. The invention is not restricted to any of the particular embodiments illustrated and those skilled in the art will conceive of numerous variations without departing from the invention.

I claim:

1. An electronic three-dimensional viewing system for viewing two-dimensional motion picture displays of sequential frames of images by left and right eyes of a viewer, which comprises:

a separate viewing monitor mounted for independent viewing thereof before each of the two eyes of a viewer;

a motion picture display consisting of a video recording of a conventional motion picture film typically projected onto a screen for two-dimensional viewing of sequential frames of images, said recording including stationary scenes recorded from the same line of sight and images in the scene that move in the scene from frame to frame, all typical of movies portrayed on motion picture film, a projection mechanism electronically projecting the same motion picture display on each of the two viewing monitors; and a control feature synchronizing the projection of the motion picture display onto the viewing monitors with the sequential frames of the display recorded from the same line of sight projected at a designated time delay onto one viewing monitor as compared to the same sequential frames displayed onto the other viewing monitor whereby only images on the frames which appear in motion are simultaneously seen by the two eyes at controlled offset and overlapping positions which is interpreted by the viewer's brain as three dimension.

2. An electronic three-dimensional viewing system as defined in claim 1 wherein the motion picture display is provided as duplicate recordings of the same sequential frames forming duplicate elongated strips of multiple frames, one of said motion picture recordings advanced by at least one and not more than five frames earlier than the other during viewing.

3. An electronic three-dimensional viewing system as defined in claim 2 including an adjustment for at least one of the recordings for individual adjustment of the frame advance.

4. An electronic three-dimensional display in accordance with claim 2 wherein the viewing system as defined in claim 2 is contained in a viewing device mounted to the face of a viewer.

5. An electronic three-dimensional viewing system as defined in claim 1 including a control feature performing the function of electronically darkening the motion picture displays as seen through one eye compared to the other eye.

6. An electronic three-dimensional viewing system as defined in claim 1 including a control feature performing the function of distorting the image displays of the motion picture as viewed by one eye as compared to the other eye.

7. An electronic three-dimensional viewing system as defined in claim 6 wherein the monitors are television screens and said control feature for distorting the images includes side shifting of the image viewed by one eye as compared to the image viewed by the other eye.

8. An electronic three-dimensional viewing system as defined in claim 6 wherein the control feature for distorting the images includes horizontal expansion of the image viewed by one eye is compared to the image viewed by the other eye.

9. An electronic three-dimensional display as defined in claim 1 including control features for discriminate darkening and distortion of the image display through at least one of the eyes, and a further control feature for individual and independent adjustment of the advance in projection.

10. An electronic three-dimensional display as defined in claim 9 wherein a helmet to be worn by the viewer contains the viewing monitors.

11. An electronic three-dimensional display as defined in claim 9 wherein a pair of goggles includes said viewing monitors positioned in front of a viewer's eyes when worn by a viewer.

12. An electronic three-dimensional display in accordance with claim 1 including a control feature for side shifting the positioning of the images projected onto the monitors.

* * * * *